May 6, 1952     C. W. PAUL     2,595,696
SLICING AND STORING DEVICE
Filed July 7, 1949
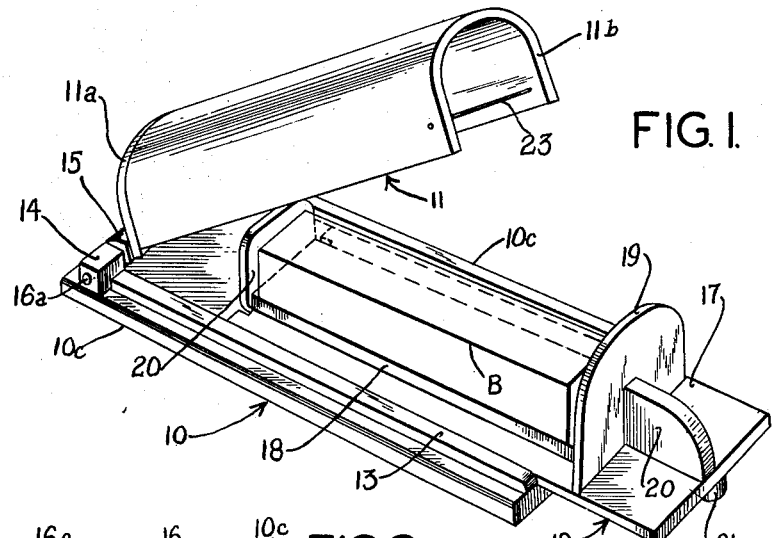
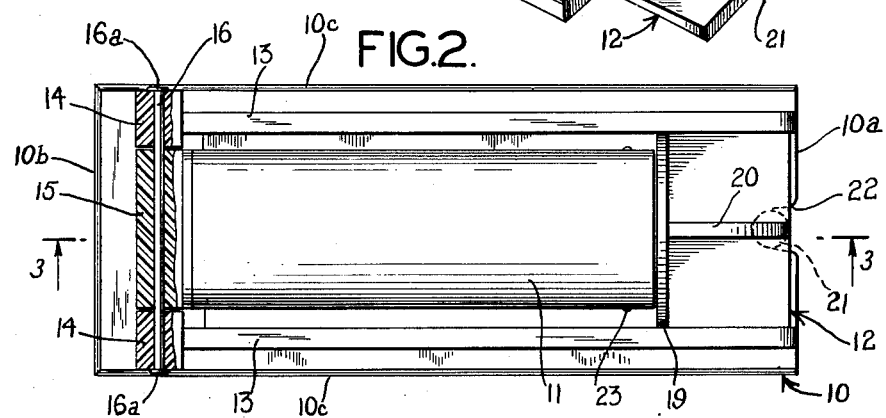
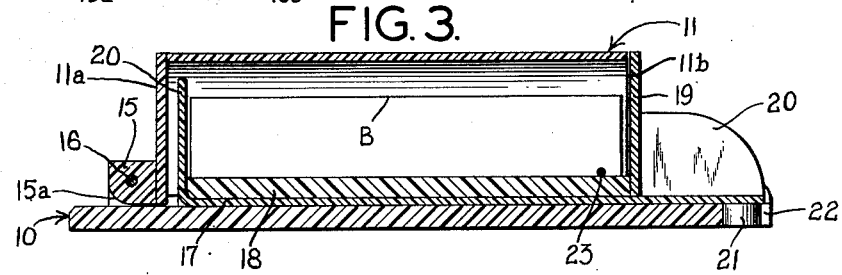
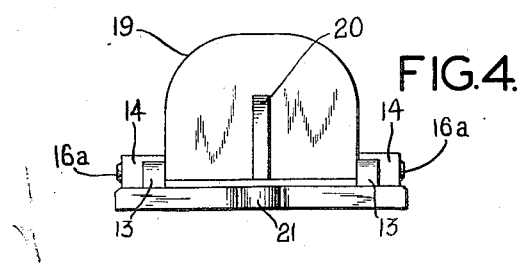
INVENTOR.
CARL WM. PAUL
BY *Mock & Blum*
ATTORNEYS.

Patented May 6, 1952

2,595,696

UNITED STATES PATENT OFFICE 2,595,696

SLICING AND STORING DEVICE

Carl W. Paul, New York, N. Y.

Application July 7, 1949, Serial No. 103,348

6 Claims. (Cl. 31—20)

My invention relates to a slicing and storing device for butter, cheese and the like.

I provide a container for storing butter and similar food products which is provided with a slidable platform upon which the contained food product rests, and by means of which the contained food product may be advanced from said container. It is an object of my invention also to provide a device of the character described in which the cover member is pivotally mounted, and in which the cutting means is located within the cover member in such a position that movement of said cover member actuates said cutting means.

Another object of the invention is the provision of a device of the character described which has no separate movable cutting means which may become broken, bent, or otherwise damaged in use.

Still another object of the invention is the provision of a device of the character described which is composed of a few simple parts which may be economically molded from plastic, or glass.

A further object of the invention is the provision of a device of the character described which is sufficiently attractive in appearance to enable it to be used at the table for serving and dispensing the contained food article.

Other objects and advantages of the invention will be readily apparent in the course of the following specification when taken in connection with the accompanying drawings in which:

Fig. 1 is a perspective view showing the device as it would be used for slicing a contained bar of butter;

Fig. 2 is a top plan view of the device shown in closed position, with portions thereof being shown in section;

Fig. 3 is a sectional view as taken along the line 3—3 of Fig. 2; and

Fig. 4 is a front elevation view of the device.

Referring in detail to the drawings, the slicing and storing device of my invention comprises a base portion 10, a cover portion 11, and a food supporting platform portion 12. The base portion 10 has a front wall 10a, a rear wall 10b, and respective side walls 10c. The top surface of base portion 10 bears a pair of upstanding, spaced, longitudinally-extending ribs 13. Each of these ribs 13 are located adjacent one of the respective side walls 10C of base 10, and are parallel with said side walls.

The front edges of the ribs 13 register with the front wall 10a of base 10. The rear edge of each rib 13 abuts an upstanding post 14 which projects from the top surface of the base 10. In the preferred embodiment of the invention in which the device is molded of a rigid transparent plastic, the ribs 13 and posts 14 may be molded integrally with the base 10.

The cover portion 11 is shown in the drawings as being rectangular in plan view and having a rounded or arcuate top surface, although it is to be understood that said cover portion may be made in any desired shape. Cover portion 11 has a closed rear end 11a and an open front end 11b. The cover 11 is molded with a block 15 projecting from the bottom edge of the closed rear end 11a. Block 15 is made of such a size that it fits between the upstanding posts 14 of base 10. A cylindrical metal rod 16 is inserted through respective openings in posts 14 and block 15, said rod 16 having flattened ends 16a by means of which it is held in its inserted position. The cover 11 is normally held in a downward position in which it rests between the ribs 13 of base 11.

As shown in Fig. 1, cover 11 may be raised from base 10, the block 15 pivoting about the rod 16. In order to enable block 15 to be pivoted, the lower surface of said block 15 is rounded as shown at 15a in Fig. 3.

The platform portion 12 comprises a flat bottom wall 17 having a food supporting portion herein illustrated as a flat platform piece 18 which is secured to said bottom wall 17, respective front and rear walls 19 and 20 which project upwardly from the top surface of bottom wall 17 at either end of the platform piece 18, and a finger piece 20. The width of bottom wall 17 of platform portion 12 is such that said bottom wall fits slidably between the ribs of raised portion 10. The platform portion 12 may thus be slid longitudinally relative to the base portion 10, the ribs 13 acting as guides for this longitudinal movement. The platform piece 18 is suitably sized to enable a bar of butter or similar food item to be placed thereon. The walls 19 and 20 serve to hold a food in place upon said platform piece 18. In Fig. 1 an inserted bar of butter is shown in broken line, the bar being indicated by reference numeral B.

It is to be noted that the front wall 19 has a size and shape which is equal to the size and shape of the open front end 11b of cover portion 11. Said front wall 19 is located upon bottom wall 17 of platform portion 12 in such a position that when said platform portion 12 is slid as far as it will go toward the rear wall 10b of base portion 10, said wall 19 abuts the open ends 11b of cover portion 11 and acts as a closure for said open portion. In this position the cover portion 11 is completely closed and the contained food therein may be conveniently stored in this manner in a refrigerator. In the closed position of the cover, the bottom edges of said cover 11 abut the surface of the flat bottom wall 17 of platform portion 12, in parallel alinement therewith.

The flat bottom wall 17 of platform portion 12 is provided with a depending post 21 located adjacent the front end thereof. The front wall 10a of the base portion 10 is provided with a recessed portion 22 which is positioned to register with said post 21. Said post 21 and recessed portion 22 cooperate to act as stop means to prevent said platform portion 12 from being slid toward the rear end of base portion 10, and maintain said platform portion 12 in such a position that the rear wall 20 thereof is spaced from the closed end 11a of cover portion 11. This spaced relationship is clearly shown in Fig. 3.

The cover portion 11 is provided with slicing means which is located adjacent the open end portion 11b. This slicing means comprises a thin metal wire 23 which is secured at either end to the walls of the cover 11 and extends transversely of said cover. The wire 23 may be spaced from the front open end 11b of cover 11 at any desired distance, but preferably it is spaced a distance which corresponds to the desired width of the slices of butter or other contained food. The wire 23 is also suitably spaced from the bottom edge of the cover 11 so that said wire will rest upon the upper edge of the platform piece 18 when said cover 11 is in its downward closed position.

In operation the device may be used as follows: The cover portion 11 is raised as shown in Fig. 1 and a bar of butter B or other similar food is placed upon the platform piece 18 between the front and rear walls 19 and 20 of the platform portion 12. The platform portion 12 is then slid longitudinally toward the rear wall 10b of base portion 10 until it is stopped by the entry of post 21 into the recess 22. The cover portion 11 is then moved to its downward position in which the bottom surface of said cover abuts the upper surface of the platform portion bottom wall 17. In this closed position the cutting wire 23 will cut one slice of the contained butter B as soon as the cover 11 is lowered. As additional slices of butter are desired, the platform portion 12 is slid away from the rear wall 10b of base portion 10 to a distance corresponding to the desired thickness of the slices, and the cover 11 is again lowered. This operation is continued until the entire bar of butter B is sliced.

It will be noted that the device is particularly adapted to be fully operated with two hands. As shown in Fig. 1 one hand of the user is employed to lift the cover portion 11, and at the same time to hold said cover portion and the attached base portion 10 in a fixed and immovable position. The other hand of the user is employed to slide the platform portion 12 to its desired position. The hand grasping cover portion 11 may then lower said cover to its closed position in which the wire 23 will slice a desired portion of the contained food B.

I have thus provided a slicing and storing device in which the cover portion 11 itself is utilized to slice the butter or other contained food. The cover portion 11 is pivoted to the base 10 at the thickest portions of these parts, so that there is very little possibility of the parts breaking in use. If the device is made as was previously suggested from transparent plastic such as Lucite, the device presents such a pleasing appearance that it may be set upon the table with other table service. In addition, the butter may be placed in the device and stored within the refrigerator, the closed cover portion 11 protecting it from absorbing the odors of other food in the refrigerator.

While a preferred embodiment of the invention has been shown and described herein it is obvious that numerous omissions, changes and additions may be made in the invention without departing from the spirit and scope thereof.

I claim:

1. A slicing and storing device comprising a base, a cover, and a platform member having a food supporting portion on the upper surface thereof, the lower surface of said platform member abutting the upper surface of said base and being slidable in a longitudinal direction relative thereto between a retracted position in which the platform member is in registry with the base and an advanced position in which the front edge of the platform member is located forwardly of the base, the rear end of said cover being pivotally attached to the rear end of said base in such a manner that said cover may be pivoted into and out of flush engagement with the top surface of said platform member, said cover having an open bottom end and an open front end which has cutting means secured thereto, said cutting means being positioned to abut the top of the food supporting portion of said platform member when the said cover is lowered into contact with said platform member, said platform member having an upstanding wall adjacent its front end, said wall being positioned to close off the open front end of said cover when said cover is in its lowered position and said platform member is in its retracted position, whereby said cover is effectively closed for the storage of food therein.

2. A slicing and storing device for an article of food such as a bar of butter, comprising a base, a cover, and a platform member having a food supporting portion on the upper surface thereof, the lower surface of said platform member abutting the upper surface of said base and being slidable relative to said base, said cover having an open front end and an open bottom end which normally rests flatly upon the upper surface of said platform member, said platform member having an upstanding wall adjacent its front end, which is shaped to close off the front open end of said cover, said platform member being adapted to be slid on said base to a fully retracted position in which said upstanding wall abuts and registers with the open front end of said cover when said cover is in its normal position thereby completely closing said cover, said cover being pivotally secured at its rear end to the rear end of said base and being adapted to be raised from its normal position, said cover having a lateral cutting member secured across its forward open end, said cutting member being positioned to slice through said article of food resting on the food supporting portion of said platform member beneath said cutting member when said cover is lowered from its raised position to its normal position.

3. A combined container and slicing device for an article of food such as a bar of butter, comprising a base, a cover, and a slide member having a food supporting portion on the upper surface thereof all made of a rigid plastic material, said slide member resting on said base and being longitudinally slidable thereon, said cover member having an open bottom end and an open front end, said slide member having an integral upstanding wall adjacent its front end, said wall being shaped to close off the open front end of said cover, said cover being pivotally secured at its rear end to the rear end of said base, said cover being sized to contain an article of food resting on said slide member rearwardly of said upstanding wall, the parts of said device being adapted to be brought to a closed position in which the open bottom end of said cover rests flushly upon the upper surface of said slide member and the upstanding wall of said slide member flushly abuts the open front end of said cover, so that the cover fully encloses the article of food resting on said slide member, said cover having cutting means rigidly secured across its open front end, said cutting means being positioned to slice through the article of food resting on the food supporting portion of said slide member.

4. A combined container and slicing device according to claim 3 in which the base has a pair of raised, spaced longitudinal ribs which abut the sides of said slide member and act as guide means for the sliding movement thereof, said food supporting portion comprising a raised platform sized to fit within the cover and adapted to bear said article of food, said cover in its closed position resting on said slide member between said platform and the ribs of said base with the cutting member of said cover extending across the top surface of said platform.

5. A combined container and storing device according to claim 3 in which the slide member has an integral finger-piece located forwardly of its upstanding wall, said finger-piece serving as means for manual sliding movement of said slide member.

6. A combined container and storing device according to claim 3 in which the base has a pair of integral, spaced blocks adjacent its rear end, and said cover has a block integral with its rear end, said cover block fitting between the blocks of said base and being turnably attached thereto.

CARL WM. PAUL.

REFERENCES CITED

The following references are of record in the file of this patent:

UNITED STATES PATENTS

| Number | Name | Date |
|---|---|---|
| 1,499,235 | Livingston | June 24, 1924 |
| 1,595,097 | Howell | Aug. 10, 1926 |
| 1,679,004 | Pinkel et al. | July 31, 1928 |
| 2,232,918 | Keefer | Feb. 25, 1941 |
| 2,356,179 | Proudman et al. | Aug. 22, 1944 |
| 2,444,704 | Keefer | July 6, 1948 |

FOREIGN PATENTS

| Number | Country | Date |
|---|---|---|
| 58,441 | Denmark | Feb. 10, 1941 |